(12) United States Patent
Jung et al.

(10) Patent No.: US 9,116,523 B2
(45) Date of Patent: Aug. 25, 2015

(54) APPARATUS AND METHOD OF CELL-BASED PATH PLANNING FOR MOBILE BODY

(75) Inventors: Jin-Woo Jung, Seoul (KR); ByungChul So, Seoul (KR)

(73) Assignee: Dongguk University Industry-Academic Cooperation Foundation, Seoul (KR)

( * ) Notice: Subject to any disclaimer, the term of this patent is extended or adjusted under 35 U.S.C. 154(b) by 530 days.

(21) Appl. No.: 13/303,620

(22) Filed: Nov. 23, 2011

(65) Prior Publication Data

US 2012/0221237 A1 Aug. 30, 2012

(30) Foreign Application Priority Data

Feb. 25, 2011 (KR) ........................ 10-2011-0017375

(51) Int. Cl.
*G05D 1/02* (2006.01)
*G06F 17/10* (2006.01)

(52) U.S. Cl.
CPC .............. *G05D 1/0274* (2013.01); *G06F 17/10* (2013.01)

(58) Field of Classification Search
None
See application file for complete search history.

(56) References Cited

U.S. PATENT DOCUMENTS

| | | | | |
|---|---|---|---|---|
| 5,696,675 A * | 12/1997 | Nakamura et al. | ............... | 701/50 |
| 7,248,965 B2 * | 7/2007 | Tanizaki et al. | ............... | 701/533 |
| 7,275,237 B1 * | 9/2007 | Schneider et al. | ............ | 717/108 |
| 7,904,848 B2 * | 3/2011 | Coene et al. | ................... | 716/126 |
| 8,018,792 B2 * | 9/2011 | Kyun et al. | ...................... | 367/11 |
| 8,060,254 B2 * | 11/2011 | Myeong et al. | ................ | 700/253 |
| 8,442,805 B2 * | 5/2013 | Reem et al. | ........................ | 703/2 |
| 8,538,377 B2 * | 9/2013 | Colonna et al. | ................ | 455/405 |
| 2003/0109296 A1 * | 6/2003 | Leach et al. | ....................... | 463/6 |
| 2005/0102097 A1 * | 5/2005 | Tanizaki et al. | ............... | 701/208 |
| 2006/0271898 A1 * | 11/2006 | Kitamura | ........................ | 716/12 |
| 2007/0220522 A1 * | 9/2007 | Coene et al. | ................... | 718/104 |
| 2007/0293985 A1 * | 12/2007 | Myeong et al. | ............... | 700/245 |
| 2008/0140364 A1 * | 6/2008 | Friedman | ......................... | 703/2 |
| 2012/0047098 A1 * | 2/2012 | Reem | .............................. | 706/12 |

OTHER PUBLICATIONS

Jin-Woo, J. et al., *An Idea to Reduce Number of Cells in the 2D Exact Cell Decomposition-based Mobile Robot Path Planning*, The 7th International Conference on Ubiquitous Robots and Ambient Intelligence (URAI 2010) 417-418.

* cited by examiner

*Primary Examiner* — Mussa A Shaawat
(74) *Attorney, Agent, or Firm* — Alston & Bird LLP

(57) ABSTRACT

Disclosed are an apparatus and method of cell-based path planning for a mobile body and a computer-readable recording medium storing the method therein. The method includes receiving a configuration space including a start point and a goal point of the mobile body and position information of obstacles, determining a search order of the obstacles located in the configuration space, performing cell decomposition by repeatedly connecting a vertex of one of the obstacles to a vertex of another obstacle according to the determined search order, and performing cell decomposition by making an extended line from each of non-connected vertices in a direction of dividing vertical angle of each of the non-connected vertices into two.

18 Claims, 11 Drawing Sheets

[A]                [B]

[C]     [D]

N : The total number of polygons
Ki : The total number of vertexes of polygon (i = 1 ~ N)
V : Vertex  L :Line
Vs : The vertex have shortest pass from V
U : The total set of vertex
P : The array of vertex (P = { Vij | 1 <= i <= N, 1 <= j <= Ki } )
S1, S2, S3 : The list of vertex that is used in each step

FIG. 12b

1. Determine the search order of the polygons

2. Algorithm of 1-step

```
FOREACH V in P
    IF V = concave vertex THEN
        Remove V from P
        Continue
    END IF
    Clear vertexes from S1
    Insert all of vertex in U to S1 except V
    Sort vertexes in S1 based on distance between each vertex and V by ascending
    WHILE S1 > 0 THEN
        Get Vs from S1 and draw virtual line VL from V to Vs
        IF VL and all of C-obstacle don't intersect THEN
            IF VL is included in range of opposite angle of V THEN
                Draw real line from V to Vs
                Remove V from P
                IF VL is included in range of opposite angle of Vs THEN
                    Remove Vs from P
                ELSE IF Vs has more two lines THEN
                    IF all of angle of each two lines <= 180 degree THEN
                        Remove Vs from P
                END IF
            Break
        ELSE
            END IF
            Remove Vs from S1
        END IF
    END WHILE
END FOREACH
```

FIG. 12c

3. Algorithm of 2-step

```
FOREACH V in P
    Clear all of vertex from S2
    Insert vertexes that is subset of U included in range of opposite angle of V to S2
    IF size of S2 = 0 THEN
        Continue
    END IF
    Sort vertexes in S2 based on distance between each vertex and V by ascending
    WHILE S2 > 0 THEN
        Get Vs from S2 and draw virtual line VL from V to Vs
        IF VL and all of C-obstacle or lines don't intersect THEN
            Draw real line from V to Vs
            Remove V from P
            IF VL is included in range of opposite angle of Vs THEN
                Remove Vs from P
            ELSE IF Vs has more two lines THEN
                IF all of angle of each two lines <= 180 degree THEN
                    Remove Vs from P
                END IF
            END IF
        ELSE
            Remove Vs from S2
        END IF
    END WHILE
END FOREACH 4. Algorithm of 3-step FOREACH V in P
    Draw line from V in direction of half opposite angle of V until intersect with C-obstacle,
    line and contour line of map
END FOREACH
```

APPARATUS AND METHOD OF CELL-BASED PATH PLANNING FOR MOBILE BODY

CROSS-REFERENCE TO RELATED APPLICATIONS

This application claims priority under 35 U.S.C. §119 to Korean Patent Application No. 10-2011-0017375, filed on Feb. 25, 2011, in the Korean Intellectual Property Office, the disclosure of which is incorporated herein by reference in its entirety.

BACKGROUND

1. Field of the Invention

The present invention relates to an apparatus and method of cell-based path planning for a mobile body. More specifically, the present invention relates to an apparatus and method of path planning for such a mobile body as a robot to travel from a given start point to a given goal point while avoiding obstacles encountered within a specific space using position information, and a computer-readable recording medium storing the method therein.

2. Description of Related Art

Robots have been developed to replace human labor as a part of factory automation in industrial applications and have been also employed to perform dangerous tasks in extreme environments humans cannot endure. With the recent development of robot technologies, the robots are found not only in industrial applications but in medical applications, household appliances, educational applications, and deep-sea or space exploration. For such a mobile body to have the capability to move around and automatically perform tasks without human control, the most fundamental and essential factor is a path-finding mechanism which is configured for the mobile body to efficiently travel around. That is, the mobile body equipped with the path-finding mechanism may automatically move along the searched route.

On the other hand, the mobile body needs a map for a motion space to perform tasks within the motion space. In order to make the map for a motion space, an algorithm for the map is further needed. For example, a wall-following algorithm may be used to find the entire configuration of the motion space, or active simultaneous localization and mapping (SLAM) may be employed to perform path planning. After the map is completed, coverage path planning may be additionally needed for the mobile body to fully cover the entire motion space within the map.

Cell decomposition has been widely used as a path planning method for a given map. The cell decomposition decomposes a specific space into cells where a mobile body completes a task in one of the cells and moves to another cell. The mobile body may use a grid map which is a two-dimensional (2D) map for an environment using an IR sensor, an ultrasonic sensor, or a laser sensor.

In general, the absolute position of the mobile body may be determined using a global positioning system (GPS) or a beacon equipped with an ultrasonic sensor and installed in a working environment. The relative position of the mobile body may be determined by obtaining rotation speed and translation speed from an encoder and calculating the integration of the rotation speed and translation speed or by calculating the double integration of an acceleration value obtained from an accelerator sensor.

However, the motion performance of the mobile body is determined depending mainly on how the mobile body makes an efficient path planning.

SUMMARY OF THE INVENTION

The present invention is directed to an apparatus and method for improving path search performance of a mobile body through an improved path planning configured to minimize an excessive number of cells due to cell decomposition performed in a single decomposing direction for path planning.

According to an aspect of the present invention, there is provided a path planning method for a mobile body including receiving a configuration space including a start point and a goal point of the mobile body and position information of obstacles, determining a search order of the obstacles located in the configuration space, performing cell decomposition by repeatedly connecting a vertex of one of the obstacles to a vertex of another obstacle according to the determined search order, and performing cell decomposition by making an extended line from each of non-connected vertices in a direction of dividing vertical angle of each of the non-connected vertices into two.

The performing of cell decomposition by repeatedly connecting a vertex of one of the obstacles to a vertex of another obstacle may include connecting a vertex of a first obstacle to a vertex of a second obstacle located nearest to the vertex of the first obstacle if the vertex of the second obstacle is present within vertical angle of the vertex of the first obstacle using the position information, and connecting a vertex of a third obstacle to a vertex of a fourth obstacle located nearest to the vertex of the third obstacle within vertical angle of the vertex of the third obstacle using the position information among vertices which are not connected.

The performing of cell decomposition by making an extended line may include dividing vertical angle of each of the non-connected vertices into two from each of the non-connected vertices, and making an extended line from each of the non-connected vertices to a decomposing line, an obstacle or a boundary line of the configuration space, which is located nearest to each of the non-connected vertices in the direction of dividing the vertical angle of each of the non-connected vertices into two, using the position information.

According to another aspect of the present invention, there is provided a computer-readable recording medium recording a program for implementing the above-mentioned method on a computer.

According to still another aspect of the present invention, there is provided a path planning apparatus for a mobile body, including a storage configured to receive and store a configuration space including a start point and a goal point of the mobile body and position information of obstacles, and a processor configured to plan a search path for the mobile body based on the configuration space stored in the storage. Furthermore, the processor may include a search order determination unit configured to determine a search order of obstacles located in the configuration space, and a cell decomposition unit configured to perform cell decomposition by repeatedly connecting a vertex of an obstacle to a vertex of another obstacle in the determined search order and by making an extended line from each of non-connected vertices in a direction of dividing vertical angle of each of the non-connected vertices into two.

The cell decomposition unit may perform cell decomposition by connecting a vertex of a first obstacle to a vertex of a second obstacle located nearest to the vertex of the first obstacle if the vertex of the second obstacle is present within vertical angle of the vertex of the first obstacle using the position information, and for the non-connected vertices, the cell decomposition unit may perform cell decomposition by connecting a vertex of a third obstacle to a vertex of a fourth obstacle located nearest to the vertex of the third obstacle if the vertex of the fourth obstacle is located within vertical angle of the vertex of the third obstacle using the position information.

The cell decomposition unit may perform cell decomposition by dividing vertical angle of each of the non-connected vertices into two from each of the non-connected vertices, and making an extended line from each of the non-connected vertices to a decomposing line, an obstacle or a boundary line of the configuration space, which is located nearest to each of the non-connected vertices in the direction of dividing the vertical angle of each of the non-connected vertices into two, using the position information.

Other features will become apparent to those skilled in the art from the following detailed description, which, taken in conjunction with the attached drawings, discloses exemplary embodiments of the invention.

BRIEF DESCRIPTION OF THE DRAWINGS

FIGS. 11a and 11b illustrate a path planning method according to the present embodiment and a conventional path planning method through cell decomposition performed in a single decomposing direction.

FIGS. 12a to 12c illustrate computer readable pseudo-code for implementing the path planning method for a mobile body according to an exemplary embodiment of the present invention.

DETAILED DESCRIPTION OF THE INVENTION

Prior to the explanation of exemplary embodiments of the invention, environments and basic concepts for the present embodiments will be introduced.

A configuration space is an important concept for path planning for a mobile body. Mobile bodies have different shapes, which causes the mobile bodies to have different path planning algorithms although the mobile bodies have the same start and goal points on a map. The configuration space may be a solution to this problem. The configuration space allows a mobile body to be identified as a single point regardless of the mobile body's shape by extending obstacles present in a space based on the shape and motion mechanism of the mobile body. The number of dimensions of the configuration space is identical to the number of degrees of freedom of the mobile body. A configuration obstacle refers to an obstacle which is virtually expanded in size on the configuration space. The configuration space and the configuration obstacle serve as basic concepts for a path planning algorithm configured to allow the mobile body to find a collision-free path.

Cell decomposition is a representative path algorithm for an autonomous mobile robot which employs the configuration space. Specifically, the cell decomposition is an algorithm configured to decompose the entire environment into cells according to a specific standard, to represent the cells as points of a graph, and to select some of the cells to generate a motion path of a mobile body. Conventional cell decomposition is performed with a fixed decomposing direction. That is, a space is decomposed into cells in a single decomposing direction according to the conventional cell decomposition.

Figure 1:
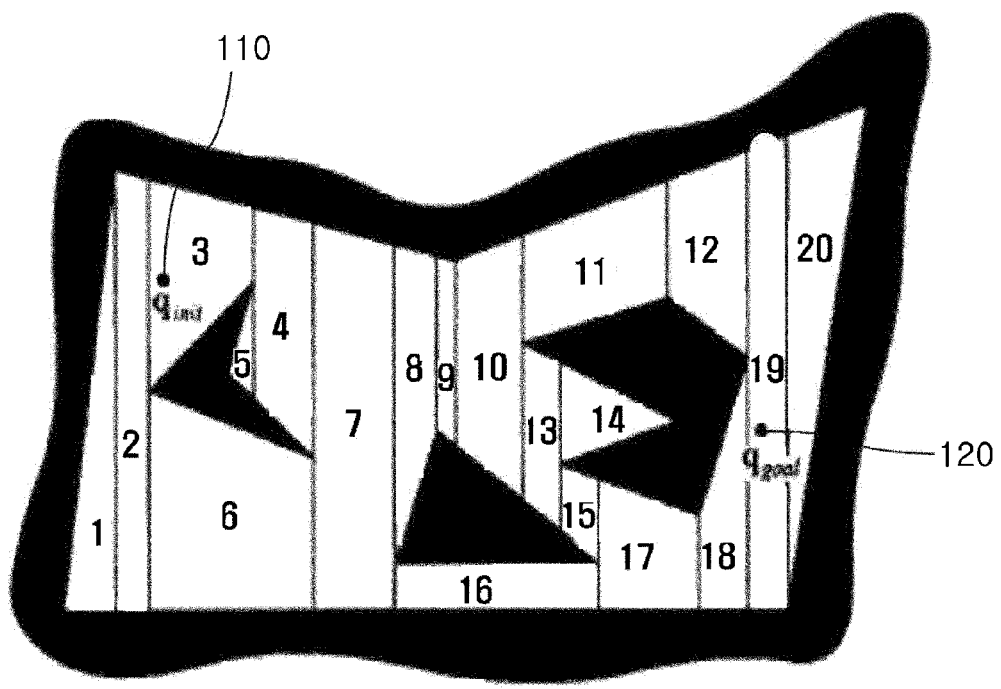
FIG. 1 illustrates cells generated between a start point and a goal point when cell decomposition is performed only in a single decomposing direction within a configuration space.

FIG. 1 illustrates cells between a start point and a goal point when cell decomposition is performed only in a single decomposing direction within a configuration space. Referring to FIG. 1, the cell decomposition is performed only in a vertical direction to make eleven (11) decomposing lines between a start point 110 and a goal point 120.

However, it can be seen from FIG. 1 that the cell decomposition may be performed with fewer decomposing lines than with single-direction decomposing lines. Moreover, when a cell decomposition algorithm is performed with a vertical decomposing line or a horizontal decomposing line, it is not guaranteed that the number of cells generated with the vertical decomposing line is the same as the number of cells generated with the horizontal decomposing line. Furthermore, a fewer number of cells may be generated according to the direction of decomposing lines. It should be understood that a reduced number of cells may lead to improved path planning performance.

Accordingly, if the cell decomposition is supposed to be performed with such a mechanical algorithm, the cell decomposition has to be configured to facilitate the operation and ensure improved path planning performance. The following embodiments of the invention describe improved cell decomposition algorithms configured to reduce the number of cells. Specifically, the improved cell decomposition is configured to generate a fewer number of cells than the conventional cell decomposition by making decomposing lines with a variety of decomposing directions rather than with a single decomposing direction for vertices of configuration obstacles when path planning for an autonomous mobile robot has to be made on a map where obstacles formed of polygonal shapes are present.

Figure 2:
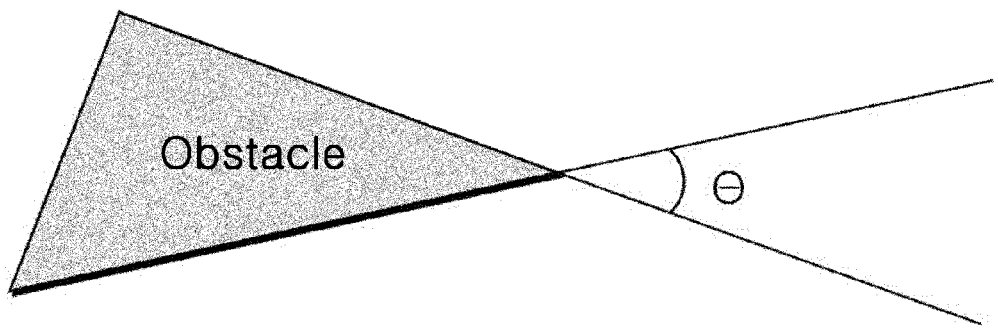
FIG. 2 illustrates a basic concept of path planning within a configuration space according to exemplary embodiments of the present invention.

FIG. 2 illustrates a basic concept of path planning within a configuration space according to exemplary embodiments of the present invention. As described above, the present embodiments are directed to decomposing the entire space into fewer cells than conventional cell decomposition.

As discussed above, the conventional cell decomposition algorithm is configured to decompose a space into cells with single-direction decomposing lines which pass through vertices of obstacles located within the space. This may result in two decomposing lines which pass through a single vertex of the obstacle. In this case, more cells may be generated in the configuration space than when a single decomposing line passes through a single vertex of the obstacle. Therefore, it can be seen that a single decomposing line passing through a single vertex of an obstacle may result in fewer cells than two or more decomposing lines passing through a single vertex of the obstacle.

On the other hand, the cell is preferably formed of a convex polygon shape. Otherwise, a search path connecting midpoints of the decomposing lines may be blocked by obstacles within the space. Accordingly, as illustrated in FIG. 2, a decomposing line formed at a vertex of an obstacle has to be present within vertical angle θ of the vertex (cone) of the obstacle so that the cell may be formed of a convex polygon shape. In this case, a concave vertex of the obstacle is not considered as a vertex of interest where a decomposing line is formed, since the concave vertex is considered a convex vertex when viewed from the cell.

The decomposing line formed at the vertex of the obstacle is preferably connected to a vertex of another obstacle located nearest to the vertex of the obstacle to prevent the decomposing line from intersecting other decomposing lines so that the number of decomposing lines may be reduced. In this case, the decomposing line at the vertex of the obstacle preferably falls within vertical angle of the vertex of the other obstacle since no more decomposing line has to be formed at the vertex of the other obstacle.

Accordingly, it is preferable that a vertex of each of obstacles of interest for cell decomposition has an acute angle and a cell is formed of a convex polygon shape so that a connection between vertices may be made within the vertical angle of each of the vertices. It should be understood that there are no limitations on the decomposing angle and decomposing direction for the cell decomposition. Exemplary embodiments of the invention will be described in detail with reference to the accompanying drawings. The same elements are denoted by the same reference numerals throughout the drawings and the detailed description.

Figure 3:
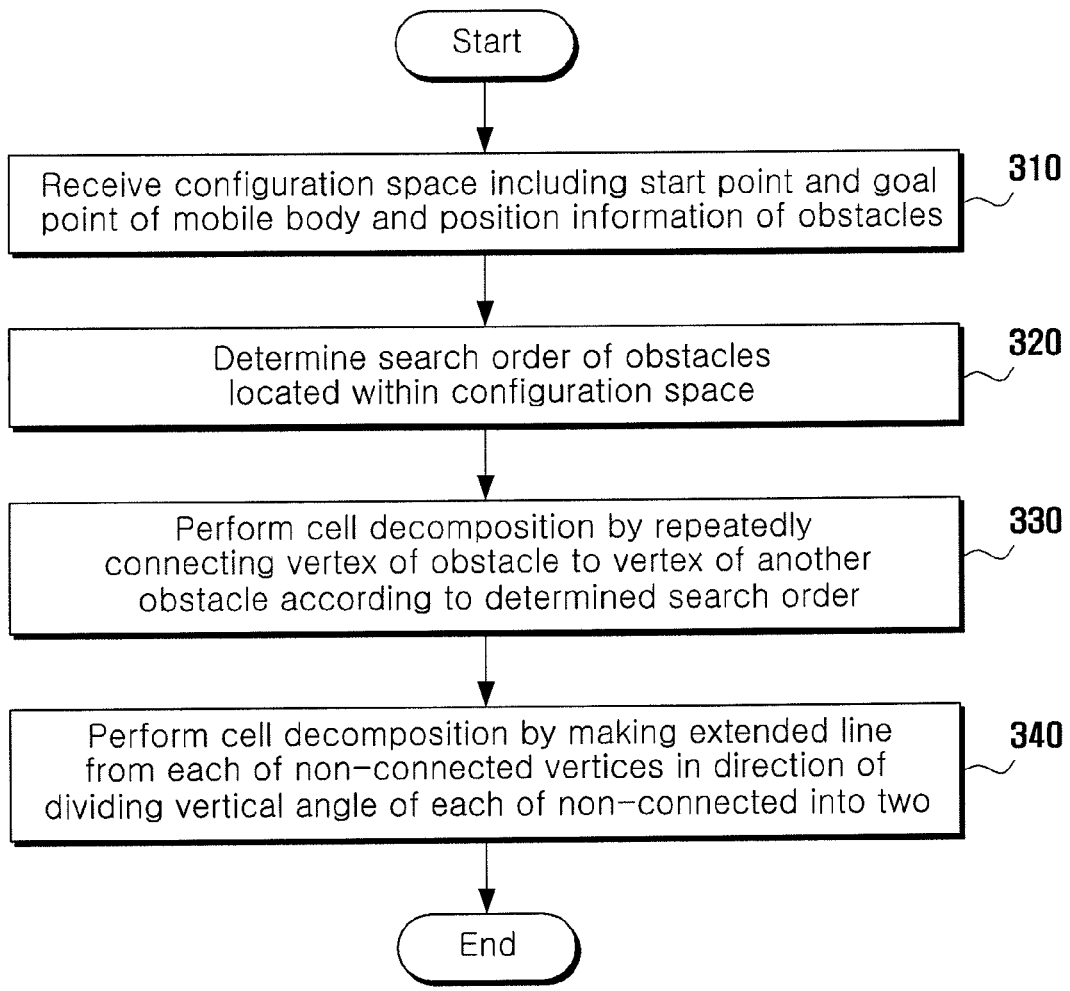
FIG. 3 is a flow chart illustrating a path planning method for a mobile body according to an exemplary embodiment of the present invention.

FIG. 3 is a flow chart illustrating a path planning method for a mobile body according to an exemplary embodiment of the present invention. The path planning method includes the following operations 310, 320, 330 and 340.

In operation 310, a configuration space including start and goal points of a mobile body and position information of obstacles is input. The configuration space may be generated according to a variety of position information representation methods, such as a grid map. The configuration space may be input to the path planning apparatus in an electronic format of data. A detailed description of the configuration space may deviate from the scope of the present embodiment and is thus omitted herein.

In operation 320, the search order of obstacles present within the configuration space is determined. The search may be performed from the top-left corner to the bottom-right corner or in any other manners.

In operation 330, the cell decomposition is performed by repeatedly connecting a vertex of an obstacle to a vertex of another obstacle in the order determined in the operation 310. This operation may be performed in two steps, which will be described in detail with reference to FIG. 4.

In operation 340, the cell decomposition is performed by making an extension line from each of vertices, which are not connected in the previous operations, in a direction of dividing into two the vertical angle of each of the vertices. This operation will be described in detail with reference to FIG. 8.

Figure 4:
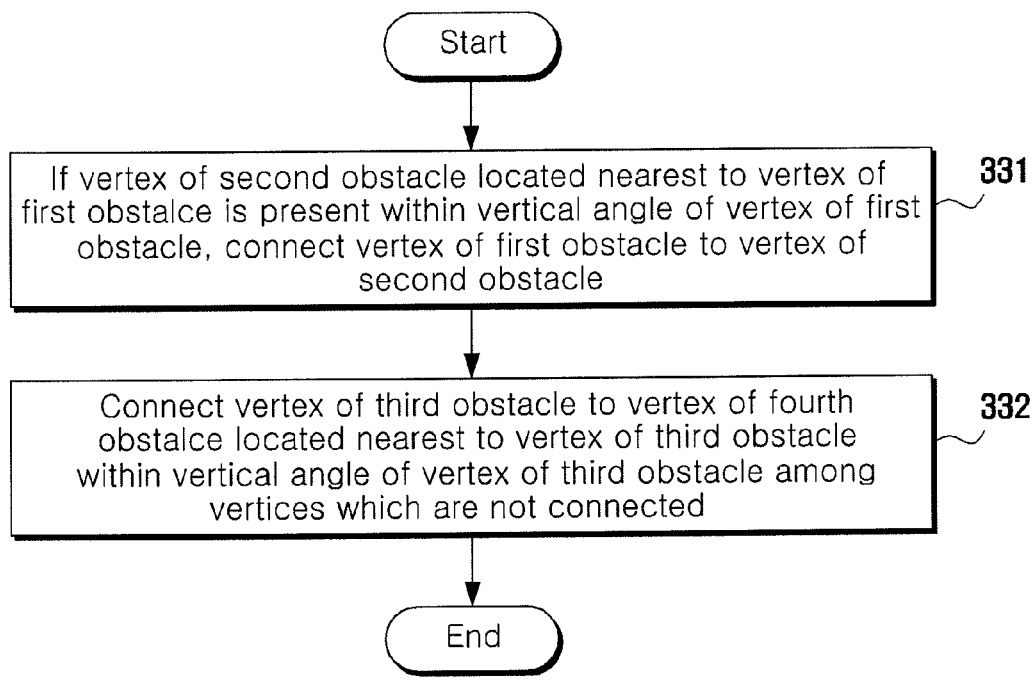
FIG. 4 is a flow chart illustrating cell decomposition through vertex connection which is one of operations performed in the path planning method of FIG. 3.

FIG. 4 is a flow chart illustrating the operation 330 in more detail in the path planning method of FIG. 3 according to an exemplary embodiment of the present invention. That is, the operation 330 is subdivided into the following two operations.

In operation 331, if it is determined using the position information that a vertex of a second obstacle located nearest to a vertex of a first obstacle is located within the vertical angle of the vertex of the first obstacle, a decomposing line is made by connecting the vertex of the first obstacle with the vertex of the second obstacle. That is, the operation 331 is performed as follows: distances between a vertex of an obstacle of interest and a vertex of each of the other obstacles are calculated; a vertex of one of the obstacles located nearest to the vertex of the obstacle of interest is found from the calculation result; a decomposing line is made to decompose the space into cells if the found vertex falls within the vertical angle of the vertex of the obstacle of interest.

In operation 332, the cell decomposition is performed on vertices which are not connected in the operation 331. Specifically, a decomposing line is made by connecting a vertex of a third obstacle to a vertex of a fourth obstacle which is located nearest to the vertex of the third obstacle and is present within the vertical angle of the vertex of the third obstacle using the position information. That is, the operation 332 is performed as follows: for vertices where decomposing lines were not made in operation 331, distances between a vertex of an obstacle of interest and a vertex of each of other obstacles are calculated; it is determined from a shorter one of decomposing lines made between the vertex of the obstacle of interest and the vertex of each of the other obstacles if there is any decomposing line which falls within vertical angle of the vertex of the obstacle of interest; if any decomposing line is determined to fall within the vertical angle of the vertex of the obstacle of interest, a decomposing line is generated therebetween.

Figure 5:
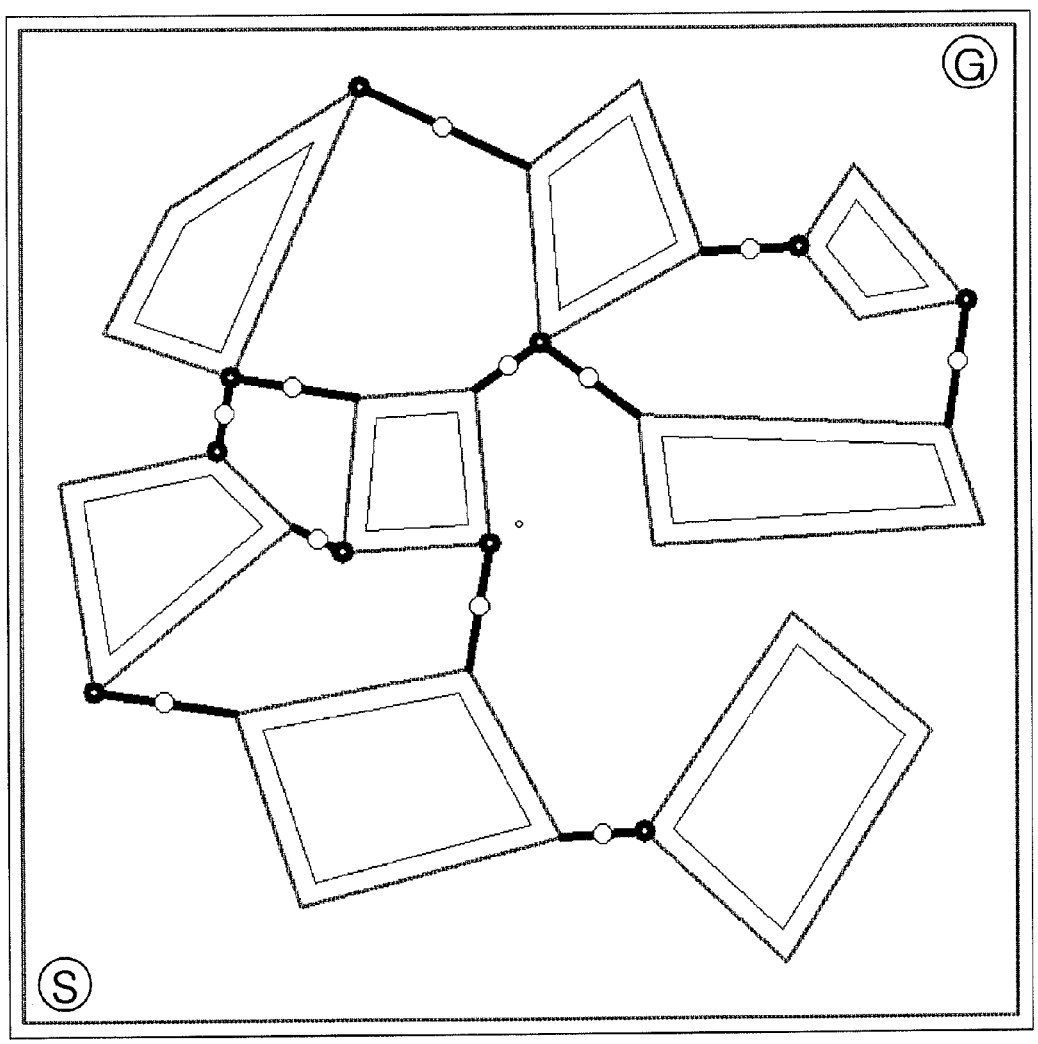
FIGS. 5 and 6 illustrate cell decomposition through vertex connection which is performed in two steps in the path planning method of FIG. 3.
Figure 6:
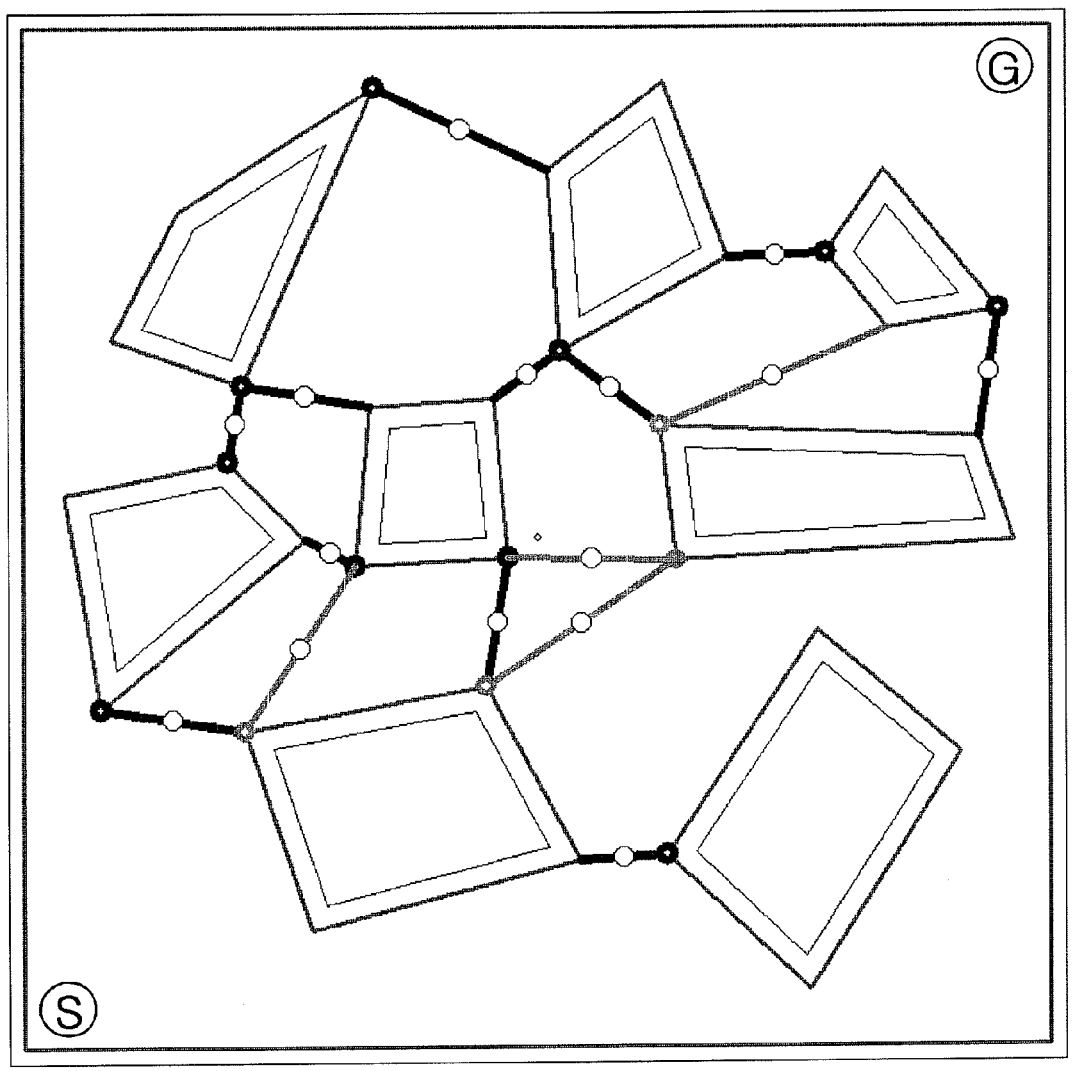

FIGS. 5 and 6 illustrate the two operations of FIG. 4 in a sequential manner in the path planning method of FIG. 3. In the accompanying drawings, the letters 'S' and 'G' denote 'start point' and 'goal point', respectively, and a boundary line surrounding each obstacle indicates a configuration obstacle which is generated considering the shape of a mobile body.

The cell decomposition in FIG. 5 is as follows: a vertex of a second obstacle located nearest to a vertex of a first obstacle is searched using the position information; it is determined using the position information whether the vertex of the second obstacle is present within the vertical angle of the vertex of the first obstacle; the vertex of the first obstacle is selectively connected to the vertex of the second obstacle according to the determination result.

Referring to FIG. 5, a bold line drawn between the configuration obstacles indicates a decomposing line after the operation 331 of the cell decomposition is completed. A small circle at the end of the decomposing line indicates a decomposing direction of the decomposing line where the decomposing direction is directed to the small circle. Another small circle in the middle of the decomposing line indicates a point of a graph. The point may be located at a midpoint of the decomposing line but may be determined considering a positional relation between the decomposing lines.

The cell decomposition in FIG. 6 is as follows: for vertices which are not connected in the operation of FIG. 5, vertices located within the vertical angle of a vertex of a third obstacle are searched using the position information; distances between the vertex of the third obstacle and each of the searched vertices are calculated; the vertex of the third obstacle is connected to a vertex of a fourth obstacle located nearest to the vertex of the third obstacle based on the calculated distance information.

Referring to FIG. 6, new decomposing lines are shown in addition to the decomposing lines shown in FIG. 5. These new lines indicate decomposing lines after the operation 332 is completed.

Two additional embodiments will be described to further reduce the number of cells in the two operations 331 and 332 of cell decomposition.

In one embodiment, if a decomposing line connecting a vertex of interest and another vertex to be present within the vertical angle of the vertex of interest also falls within the vertical angle of the other vertex, no more decomposing line has to be generated at either the vertex of interest or the other vertex. This is because another decomposing line is no more needed at the other vertex if the decomposing line connecting the vertex of interest and the other vertex falls within the vertical angle of the other vertex although the decomposing line is not generated from the other vertex.

In short, if a decomposing line made between two vertices is determined to be present within the vertical angles of each of the two vertices, each of the two vertices may be no longer considered as a vertex of interest for cell decomposition.

In another embodiment, when a vertex of an obstacle has two decomposing lines which are not located within the vertical angle of the vertex, additional decomposing line is no more needed at the vertex if an angle made by the vertex and edges of each of polygons including the vertex and the two decomposing lines is below 180°. That is, although the decomposing lines are not located within the vertical angle of the vertex, each of cells generated by the decomposing lines may be formed of a convex polygon if the angle made by the vertex and the edges of polygons including the vertex and the decomposing lines is below 180°. This will be described with reference to FIG. 7.

Figure 7:
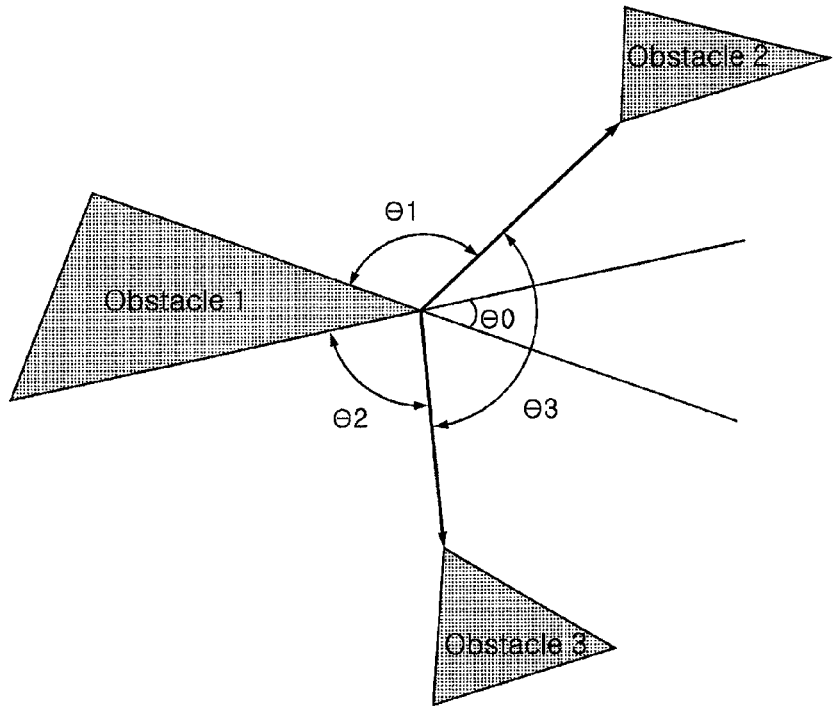
FIG. 7 illustrates a method of improving path planning performance when a vertex has two decomposing lines in a path planning method according to a further embodiment of the present invention.

FIG. 7 illustrates a method of improving path planning performance when a vertex has two decomposing lines in a path planning method according to a further embodiment of the present invention.

Referring to FIG. 7, two decomposing lines are extended from a vertex of an obstacle 1 to obstacles 2 and 3. It can be seen from FIG. 7 that although none of the decomposing lines falls within the vertical angle $\theta 0$, three cells adjacent to the decomposing lines, i.e., three cells having angles of $\theta 1$, $\theta 2$ and $\theta 3$, are formed of convex polygons.

In short, if it is determined using the position information that two decomposing lines are drawn at a vertex of interest and an angle made by the vertex of interest and the two decomposing lines is below 180°, the vertex may be no longer considered as a vertex of interest for cell decomposition.

Figure 8:
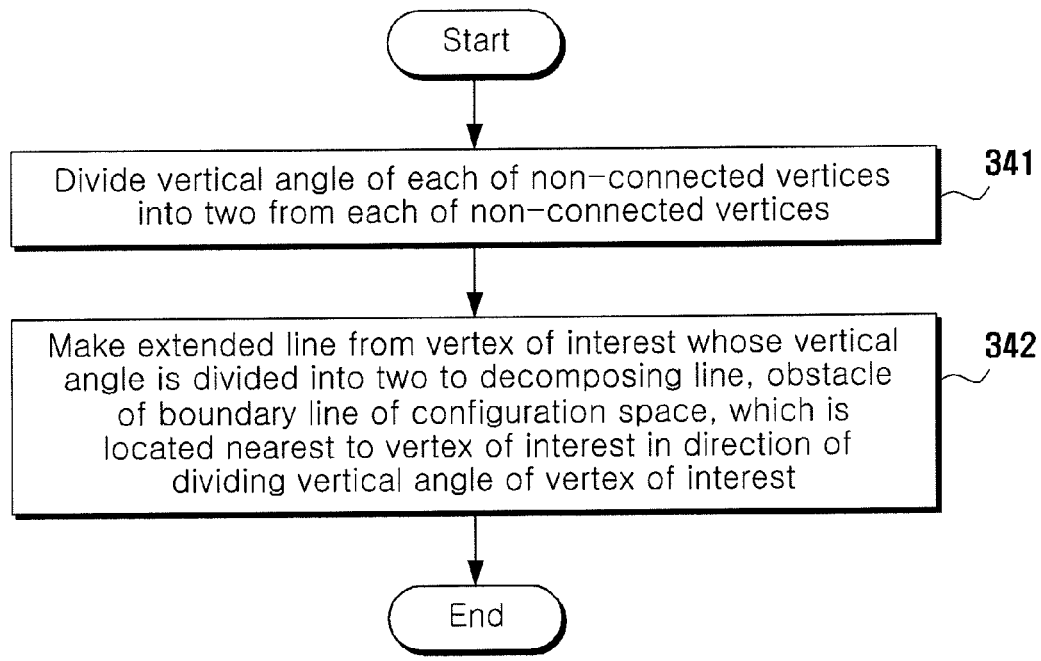
FIG. 8 illustrates a flow chart illustrating cell decomposition through an extension line which is one of operations performed in the path planning method shown in FIG. 3 according to an exemplary embodiment of the present invention.

FIG. 8 is a flow chart illustrating the operation 340 in more detail in the path planning method of FIG. 3 according to an exemplary embodiment of the present invention. In the following operations, the cell decomposition is performed on vertices which are not connected in the above-mentioned operations.

In operation 341, the vertical angle of each of vertices which are not connected in the previous operations is divided into two from each of the vertices.

In operation 342, cell decomposition is performed by making an extended line from the vertex of interest whose vertical angle is divided into two in the operation 341 to a decomposing line, an obstacle or a boundary line of a configuration space, which is located nearest to the vertex of interest in the decomposing direction. The extended line may be made to divide the vertical angle in half, but may be made in any other manners if necessary.

Figure 9:
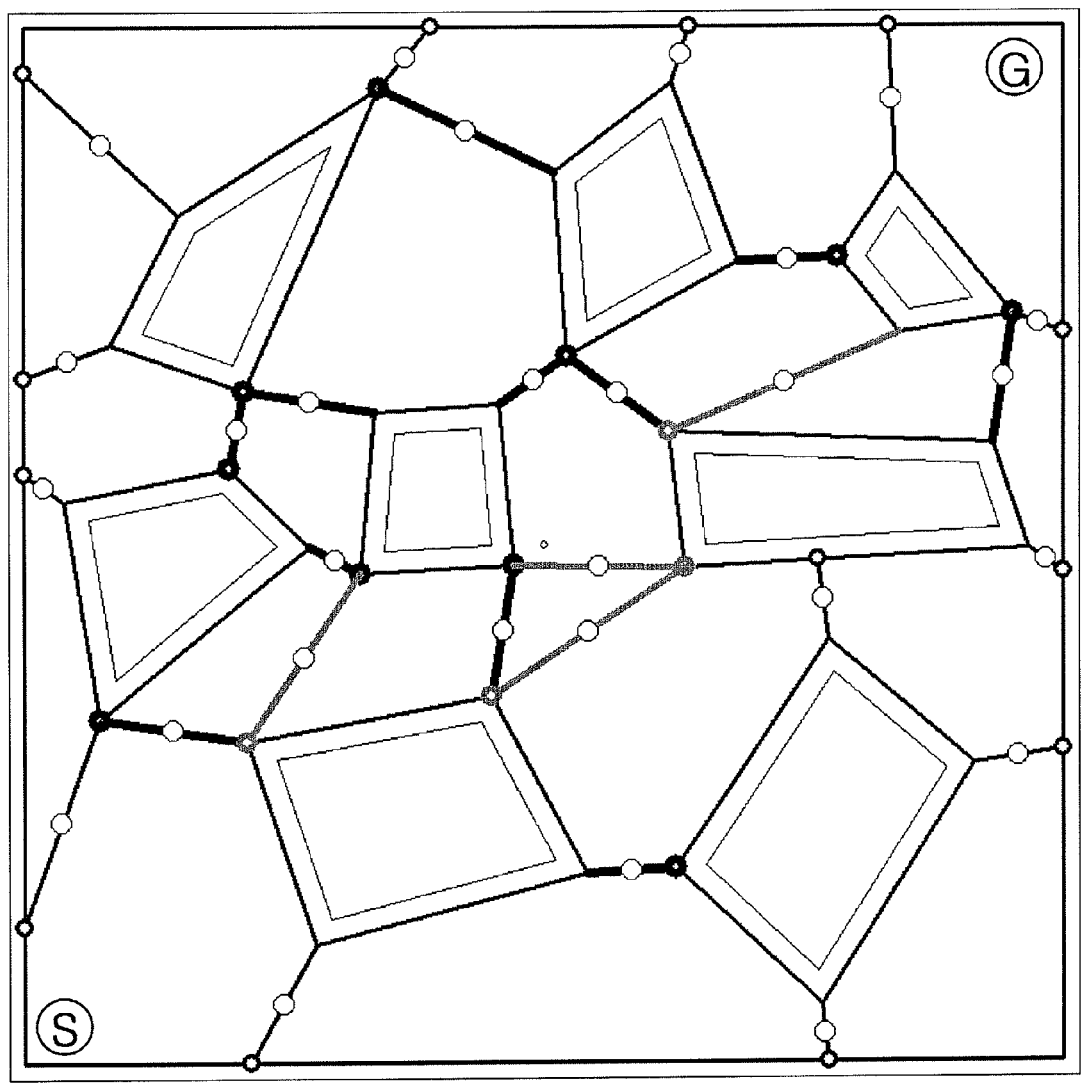
FIG. 9 illustrates cell decomposition through an extension line which is performed subsequent to FIGS. 5 and 6 in the path planning method of FIG. 3.

As described above, the operations 341 and 342 are performed on the remaining vertices of obstacles with no decomposing lines. Specifically, in order to generate cells formed of convex polygons, each of decomposing lines is made at the non-connected remaining vertices of the obstacles in the direction of dividing in half the vertical angle of each of the non-connected vertices. In this case, the configuration space is decomposed by extending the decomposing line to intersect the boundary line of the configuration space, an edge of another obstacle present within the configuration space, or a decomposing line made to decompose the configuration space. FIG. 9 is a resultant space after the operations 341 and 342 are completed.

FIG. 9 illustrates cell decomposition through an extended line which is performed subsequent to FIGS. 5 and 6 in the path planning method of FIG. 3. When compared to FIGS. 5 and 6, FIG. 9 shows additional decomposing lines which are extended to boundary lines of the configuration space or edges of the other obstacles within the configuration space.

Figure 10:
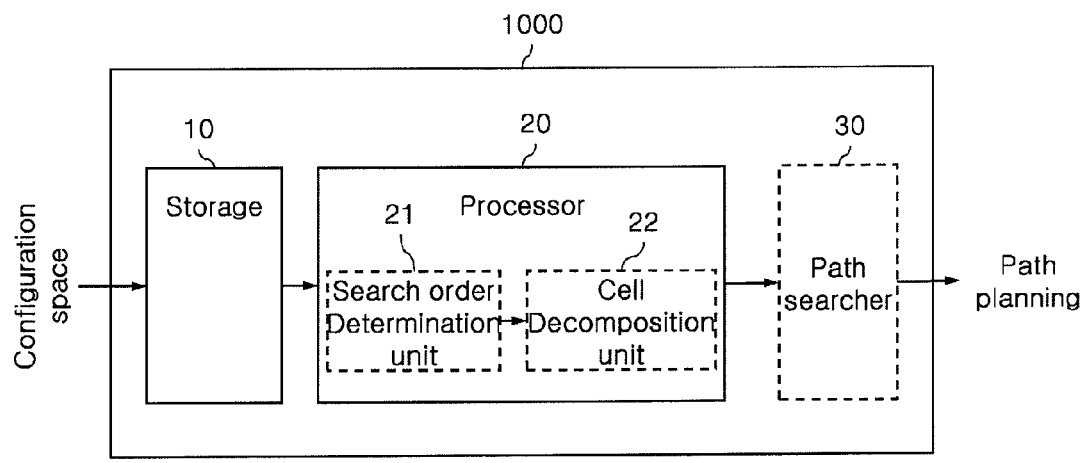
FIG. 10 is a block diagram of a path planning apparatus for a mobile body according to an exemplary embodiment of the present invention.

FIG. 10 is a block diagram of a path planning apparatus for a mobile body according to an exemplary embodiment of the present invention.

The path planning apparatus includes a storage 10 and a processor 20 as main parts. The path planning apparatus further includes a path searcher 30 for the mobile body to easily search a path through the cell decomposition generated by the processor 20. The storage 10, the processor 20 and the path searcher 30 correspond to the operations described in FIG. 3 and a detailed description thereof will thus be omitted.

The storage 10 is configured to receive and store the configuration space including the start and goal points of the mobile body and the position information of obstacles. This corresponds to the operation 310 in FIG. 3.

The processor 20 is configured to plan a search path for the mobile body based on the configuration space stored in the storage 10. This corresponds to the operations 320 to 340 in FIG. 3. The processor 20 includes a search order determination unit 21 and a cell decomposition unit 22. The search order determination unit 21 is configured to determine the search order of obstacles located in the configuration space. The cell decomposition unit 22 is configured to perform cell decomposition by repeatedly connecting a vertex of an obstacle to a vertex of another obstacle in the determined search order and by making an extended line from each of non-connected vertices in the direction of dividing the vertical angle of each of the non-connected vertices into two.

The cell decomposition unit 22 performs the cell decomposition by connecting a vertex of a first obstacle to a vertex of a second obstacle located nearest to the vertex of the first obstacle if the vertex of the second obstacle is located within the vertical angle of the vertex of the first obstacle using the position information, and by connecting a vertex of a third obstacle to a vertex of a fourth obstacle located nearest to the vertex of the third obstacle within the vertical angle of the vertex of the third obstacle using the position information with respect to vertices which are not connected. The cell decomposition unit 22 also performs cell decomposition by dividing into two the vertical angle of each of the remaining vertices at each of the remaining vertices which are not connected and by making an extended line from each of the vertices whose vertical angle is divided into two to a decomposing line, an obstacle or a boundary line of a configuration space, which is located nearest to each of the vertices in the direction of dividing the vertical angle, using the position information.

The path search unit 30 may search an optimal path by connecting points from the cells generated by the processor 20. An optimal path search method may be performed by a variety of path search algorithms, but a detailed description thereof will be omitted since it may deviate from the scope of the present invention.

Figure 11A:
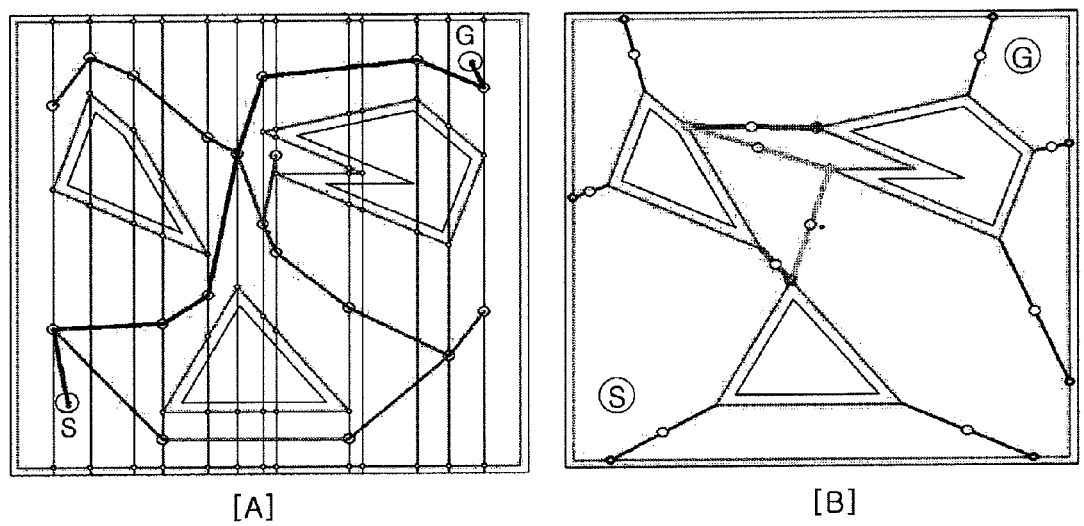
Figures 11B, 12A:
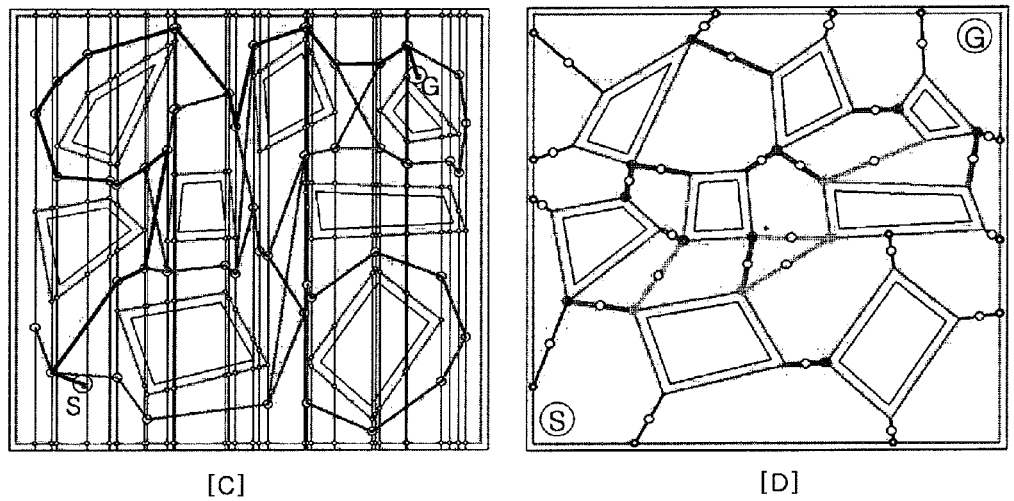

FIGS. 11a and 11b illustrate the path planning method according to the present embodiment and the conventional path planning method through cell decomposition performed in a single decomposing direction. [A] of FIG. 11a and [C] of FIG. 11b illustrate cells generated according to the conventional cell decomposition, and [B] of FIG. 11a and [D] of FIG. 11b illustrate cells generated according to the present embodiment.

It can be seen from FIGS. 11a and 11b that when compared to the conventional cell decomposition, the cell decomposition according to the present embodiment may remarkably reduce the number of cells for the same configuration space. Specifically, [A] of FIG. 11a shows twenty-one (21) points generated through the path planning while [B] of FIG. 11a shows thirteen (13) points. Therefore, the number of points is reduced by about 38% in the path planning method according to the present embodiment. Further, [C] of FIG. 11b shows fifty-five (55) points while [D] of FIG. 11b shows thirty (30) points. Therefore, the number of points is reduced by about 45% in the path planning method according to the present embodiment.

On the other hand, the present invention can be implemented as computer readable code in a computer readable recording medium.

FIGS. 12a to 12c illustrate computer readable pseudo-code for implementing the path planning method for the mobile body according to an exemplary embodiment of the present invention. FIG. 12a illustrates variables used in the program. FIG. 12b illustrates a process of determining the search order of obstacles and a first method of connecting vertices of the obstacles. FIG. 12c illustrates a second method of connecting vertices of the obstacles and a process of cell decomposition through an extended line.

The computer readable recording medium is intended to include all types of recording media in which computer readable data are stored. Examples of such computer readable recording media include ROMs, RAMs, CD-ROMs, magnetic tapes, floppy disks, and optical data storages. Further, the recording medium may be implemented in the form of a carrier wave, such as Internet transmission. In addition, the computer readable recording medium may be distributed to computer systems over a network, in which computer readable code may be stored and executed in a distributed manner. The computer readable functional programs, code and code segments for implementing the present invention may be easily inferred by computer programmers skilled in the art.

As apparent from the above description, it is possible to reduce the number of cells by making decomposing lines between vertices of obstacles with a variety of decomposing angles and decomposing directions to perform cell decomposition. In addition, the path planning can be performed with a smallest number of cells. Since a method of finding a smallest number of cells is NP-problem, a more efficient calculation may be performed when compared to a case of considering all events. As a result, it is possible to improve the path search performance of the mobile body.

The present invention has been described herein with reference to the foregoing embodiments. Those skilled in the art will appreciate that the present invention may be practiced otherwise than as specifically described herein without changing the essential features of the present invention. Therefore, it should be noted that the forgoing embodiments are merely illustrative in all aspects and are not to be construed as limiting the invention. The scope of the invention is defined by the appended claims rather than the detailed description of the invention. All modifications made within the scope of the claims should be construed as falling within the scope of the invention.

What is claimed is:

1. A path planning method for a mobile body having a path finding mechanism, the path finding mechanism planning a path for the mobile body according to a method comprising:
  receiving a configuration space comprising a start point and a goal point of the mobile body and position information of obstacles, at least one of the obstacles having a plurality of vertices;
  determining a search order of the obstacles located in the configuration space;
  performing cell decomposition, using a processor, by repeatedly connecting a vertex of one of the obstacles to a vertex of another obstacle according to the determined search order; and
  performing cell decomposition, using a processor, by making an extended line from each of non-connected vertices in a direction of dividing vertical angle of each of the non-connected vertices into two.

2. The path planning method of claim 1, wherein the performing of cell decomposition by repeatedly connecting a vertex of one of the obstacles to a vertex of another obstacle comprises:
  connecting a vertex of a first obstacle to a vertex of a second obstacle located nearest to the vertex of the first obstacle if the vertex of the second obstacle is present within vertical angle of the vertex of the first obstacle using the position information; and
  connecting a vertex of a third obstacle to a vertex of a fourth obstacle located nearest to the vertex of the third obstacle within vertical angle of the vertex of the third obstacle using the position information among vertices which are not connected.

3. The path planning method of claim 2, wherein the connecting of a vertex of a first obstacle to a vertex of a second obstacle comprises:
  searching a vertex of a second obstacle located nearest to the vertex of the first obstacle using the position information;
  determining if the vertex of the second obstacle is located within the vertical angle of the vertex of the first obstacle using the position information; and
  selectively connecting the vertex of the first obstacle to the vertex of the second obstacle according to the determination result.

4. The path planning method of claim 2, wherein the connecting of a vertex of a third obstacle to a vertex of a fourth obstacle comprises:
  searching all vertices present within vertical angle of a vertex of a third obstacle, the vertex of the third obstacle is among the vertices which are not connected using the position information;
  calculating distances between the vertex of the third obstacle and each of the searched vertices; and
  connecting the vertex of the third obstacle to the vertex of the fourth obstacle located nearest to the vertex of the third obstacle based on the calculated distance.

5. The path planning method of claim 2, wherein if the connection made between the vertices is determined to be present within vertical angle of each of the vertices based on the position information, the vertices are no longer considered as vertices to be further connected.

6. The path planning method of claim 2, wherein if it is determined based on the position information that a vertex of interest already has two connection lines to other vertices and an angle made by the two connection lines and the vertex of interest is below 180°, the vertex of interest is no longer considered as a vertex to be further connected.

7. The path planning method of claim 1, wherein the performing of cell decomposition by making an extended line comprises:
dividing vertical angle of each of the non-connected vertices into two from each of the non-connected vertices; and
making an extended line from each of the non-connected vertices to a decomposing line, an obstacle or a boundary line of the configuration space, which is located nearest to each of the non-connected vertices in the direction of dividing the vertical angle of each of the non-connected vertices into two, using the position information.

8. The path planning method of claim 7, wherein the extended line is made to divide the vertical angle in half.

9. The path planning method of claim 1, wherein the vertex for cell decomposition has an acute angle, and the connection between vertices is made with respect to vertices located within vertical angle of the vertex to generate a cell formed of a convex polygon.

10. The path planning method of claim 1, wherein the cell decomposition is performed with no restriction on a decomposing angle and a decomposing direction.

11. The path planning method of claim 1, further comprising generating a point dividing the connection line into two to be used as a candidate node for a motion path of the mobile body.

12. A non-transitory computer-readable recording medium recording a program for implementing a path planning method on a computer comprising a path finding mechanism, said computer-readable recording medium having computer-executable program code portions stored therein, the computer-executable program code portions comprising program code instructions for configuring the path finding mechanism to:
receiving a configuration space comprising a start point and a goal point of the mobile body and position information of obstacles, at least one of the obstacles having a plurality of vertices;
determining a search order of the obstacles located in the configuration space;
performing cell decomposition, using a processor, by repeatedly connecting a vertex of one of the obstacles to a vertex of another obstacle according to the determined search order; and
performing cell decomposition, using a processor, by making an extended line from each of non-connected vertices in a direction of dividing vertical angle of each of the non-connected vertices into two.

13. A path planning apparatus for a mobile body, comprising:
a storage configured to receive and store a configuration space comprising a start point and a goal point of the mobile body and position information of obstacles; and
a processor configured to plan a search path for the mobile body based on the configuration space stored in the storage,
wherein the processor comprises:
a search order determination unit configured to determine a search order of obstacles located in the configuration space, at least one of the obstacles having a plurality of vertices; and
a cell decomposition unit configured to perform cell decomposition by repeatedly connecting a vertex of an obstacle to a vertex of another obstacle in the determined search order and by making an extended line from each of non-connected vertices in a direction of dividing vertical angle of each of the non-connected vertices into two.

14. The path planning apparatus of claim 13,
wherein the cell decomposition unit performs cell decomposition by connecting a vertex of a first obstacle to a vertex of a second obstacle located nearest to the vertex of the first obstacle if the vertex of the second obstacle is present within vertical angle of the vertex of the first obstacle using the position information, and
wherein for the non-connected vertices, the cell decomposition unit performs cell decomposition by connecting a vertex of a third obstacle to a vertex of a fourth obstacle located nearest to the vertex of the third obstacle if the vertex of the fourth obstacle is located within vertical angle of the vertex of the third obstacle using the position information.

15. The path planning apparatus of claim 14, wherein the cell decomposition unit is configured to connect the vertex of the first obstacle to a vertex of a second obstacle by searching the vertex of the second obstacle located nearest to the vertex of the first obstacle using the position information, determining if the vertex of the second obstacle is located within the vertical angle of the vertex of the first obstacle using the position information, and selectively connecting the vertex of the first obstacle to the vertex of the second obstacle according to the determination result.

16. The path planning apparatus of claim 14, wherein the cell decomposition unit is configured to connect a vertex of a third obstacle to a vertex of a fourth obstacle among the non-connected vertices by searching all vertices located within vertical angle of the vertex of the third obstacle using the position information, calculating distances between the vertex of the third obstacle and each of the searched vertices, and connecting the vertex of the third obstacle to a vertex of a fourth obstacle located nearest to the vertex of the third obstacle based on the calculated distance.

17. The path planning apparatus of claim 13, wherein the cell decomposition unit performs cell decomposition by dividing vertical angle of each of the non-connected vertices into two from each of the non-connected vertices, and making an extended line from each of the non-connected vertices to a decomposing line, an obstacle or a boundary line of the configuration space, which is located nearest to each of the non-connected vertices in the direction of dividing the vertical angle of each of the non-connected vertices into two, using the position information.

18. The path planning apparatus of claim 13,
wherein the cell decomposition is performed with no restriction on a decomposing angle and a decomposing direction, and
wherein the vertex for cell decomposition has an acute angle, and the connection between vertices is made with respect to vertices located within vertical angle of the vertex to generate a cell formed of a convex polygon.

* * * * *